United States Patent [19]

Kelly et al.

[11] Patent Number: 5,367,414
[45] Date of Patent: Nov. 22, 1994

[54] TRANSDUCER/TRACK ALIGNMENT METHOD FOR MAGNETIC RECORDING MEDIA

[75] Inventors: Michael J. Kelly, Erin Prairie Township, St. Croix County; William A. Fanning, North Hudson, both of Wis.; Stacy A. Henneberger, Eagan, Minn.

[73] Assignee: Minnesota Mining and Manufacturing Company, St. Paul, Minn.

[21] Appl. No.: 208,797

[22] Filed: Mar. 9, 1994

Related U.S. Application Data

[63] Continuation of Ser. No. 753,927, Sep. 3, 1991, abandoned.

[51] Int. Cl.⁵ .................................................. G11B 5/56
[52] U.S. Cl. ............................... 360/77.12; 360/78.02
[58] Field of Search .................... 360/77.12, 78.02, 70, 360/74.1, 74.2, 75, 77.01, 78.01

[56] References Cited

U.S. PATENT DOCUMENTS

| | | | |
|---|---|---|---|
| 3,292,168 | 12/1966 | Gray | 340/174.1 |
| 3,541,270 | 11/1970 | Walther | 179/100.2 |
| 4,164,764 | 8/1979 | Joannou | 360/77.12 |
| 4,313,141 | 1/1982 | Yanagida et al. | 360/78 |
| 4,414,593 | 11/1983 | Miller et al. | 360/102 |
| 4,466,027 | 8/1984 | Howell et al. | 360/66 |
| 4,476,503 | 10/1984 | Solhjell | 360/75 |
| 4,563,713 | 1/1986 | Cahoon et al. | 360/75 |
| 4,609,959 | 9/1986 | Rudi | 360/106 |
| 4,679,104 | 7/1987 | Dahlerud | 360/78 |
| 4,866,548 | 9/1989 | Rudi | 360/78.02 |
| 5,001,580 | 3/1991 | Aranovsky et al. | 360/77.120 |

OTHER PUBLICATIONS

IBM Technical Disclosure Bulletin, Compensation For Element-To-Element Misregistration In A Dual Element Head, T. A. Schwarz, vol. 17, No. 1, Jun. (1974).
IBM Technical Disclosure Bulletin, "Servo Pattern for Measuring Position Error in Tape Systems", K. Y. Wong, vol. 17, No. 6, Nov. (1974).

*Primary Examiner*—Aristotelis Psitos
*Assistant Examiner*—P. W. Huber
*Attorney, Agent, or Firm*—Gary L. Griswold; Walter N. Kirn; Charles L. Dennis, II

[57] ABSTRACT

A method of aligning a multiple transducer magnetic head with respect to a magnetic recording tape. Values related to the offset of each transducer from a reference location are determined, using reference signals on the tape. From these values the amount of compensation required to accurately position any particular transducer with respect to any track can be calculated. By a preferred selection of the reference for one such offset value, and by taking known design of the head into account, simplified processing of the values is possible.

8 Claims, 1 Drawing Sheet

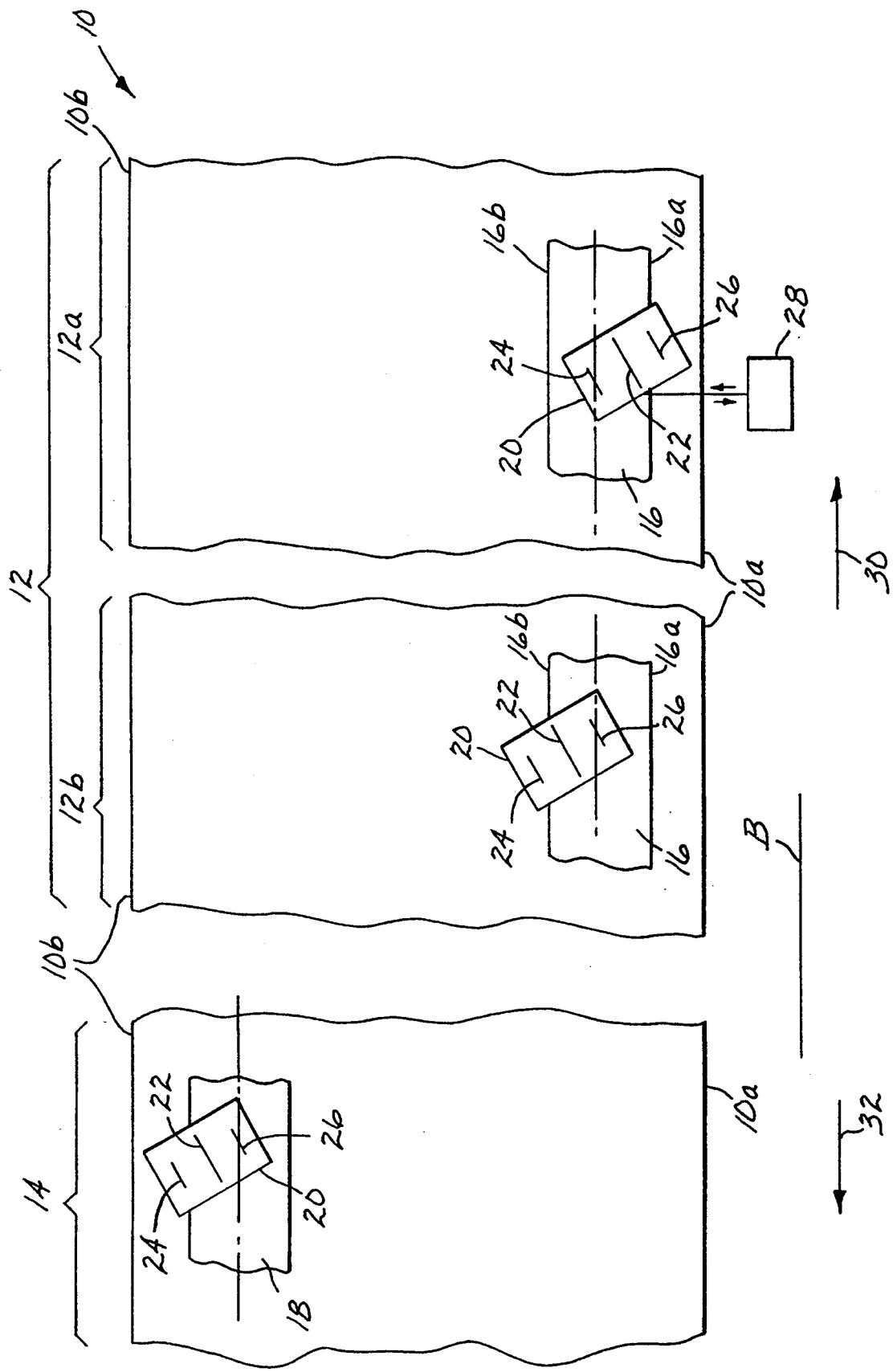

TRANSDUCER/TRACK ALIGNMENT METHOD FOR MAGNETIC RECORDING MEDIA

This is a continuation of Ser. No. 07/753,927 filed Sept. 3, 1991, now abandoned.

TECHNICAL FIELD

This invention relates to the correction of errors due to misalignment between a transducer of a magnetic recording system and a track of a magnetic recording tape.

BACKGROUND

Many magnetic recording systems employ a recording and playback head which has more than one transducer for a given track of the magnetic recording tape. For example, "read after write" heads have separate transducers for reading and writing data along the same track, and "read write read" heads have three transducers, a configuration which allows the head to operate as a "read after write" head in either direction of tape travel. (An erase transducer is generally included, but is not relevant here.)

Proper alignment of the transducers with respect to a reference plane of the system requires low tolerance specifications on the size and location of the transducers, as well as on the amount by which they may deviate from being parallel to each other and perpendicular to the base plane. However, even transducers manufactured within accepted tolerances may deviate from perfect alignment along data tracks. And, of course, the recording tape should also be aligned with respect to the reference plane within tolerances, but perfect alignment of the tape does not always occur. These problems are especially apparent when adding a new track, or when appending or overwriting data to an existing track, and more especially when that existing track was created by a different drive than the one in use.

The error due to improper head alignment with respect to the reference plane (known as head azimuth error) and the error due to improper tape alignment with respect to the reference plane (known as tape slope error) are in theory separate from each other, but in practice they both produce a common misalignment effect.

A full description of the geometry of head/track alignment errors and the hardware applicable to a magnetic recording system capable of compensating for such errors is found in either of U.S. Pat. Nos. 4,866,548 (Rudi) or 5,001,580 (Aranovsky et al.), each incorporated by reference into this application. The correction methods disclosed in these patents involve a special additional track that is read with the read transducer. However, these methods cannot be advantageously modified to directly apply to the write transducer, because using the write transducer in a reading mode requires modified electronic processing, at additional cost, and the wider gap width typical of write transducers may lead to poor signal quality, especially at higher data densities.

DISCLOSURE OF INVENTION

The invention is a method of aligning a magnetic head with respect to a magnetic recording tape having a beginning and an end region, in each of which is a track recorded with a recognizable signal. The head comprises a forward read transducer, a write transducer, and a reverse read transducer, each transducer having a longitudinal spacing distance from each other transducer.

The method comprises the steps of:
1. Locating one of the tracks of the magnetic recording medium that has a recognizable signal.
2. While the tape is moving in a forward direction, transversely centering the forward read transducer with respect to that track, thus establishing a first, reference position value.
3. While the tape is still at the beginning of the tape and the tape is still moving in the forward direction, transversely moving the head until the reverse read transducer is centered with respect to the first track; then determining the amount of transverse movement required to do so; then establishing a second, write transducer offset value from the offset value determined in step 2 and the longitudinal spacing distances between all transducers.
4. Upon reaching the end of the tape, reversing direction of tape travel.
5. While the tape is moving in the reverse direction, transversely centering the reverse read transducer with respect to the other track having a recognizable signal, thus establishing a third, reverse read transducer offset value.
6. Compensating movement of the head, if any, required for any particular transducer to access any track, by applying an offset value chosen from the first, second, and third offset values specific to the particular transducer.

THE DRAWING

The drawing is a schematic view of three portions of a magnetic recording tape suitable for practice of the invention.

DETAILED DESCRIPTION

Referring to the drawing, the invention may be implemented in a recording drive suitable for multiple track recording on magnetic recording tape 10 having end portions generally identified as the beginning region 12 and the end region 14 of the tape. "Beginning" and "end" refer to regions generally near but not necessarily exactly at the physical ends of the tape. In each of the beginning and end regions (12, 14) of the tape 10 is a reference track (16, 18) prerecorded with an identifiable signal indicating the reference nature of the track.

The recording head 20 of the recording drive comprises a write transducer 22 lying between each of two read transducers, a forward read transducer 24 and a reverse read transducer 26. Each of the three transducers is separated from the other two by known longitudinal (i.e., along the direction of tape travel) displacement values. Transverse (i.e., perpendicular to the direction of tape travel) displacement of the head 20 is performed by a fine resolution head positioning motor mechanism 28 suitably attached to the recording head 20.

Referring to portion 12a of the tape 10, to find the first offset value, that of the forward read transducer, the drive locates the reference track while the tape is in the beginning of the tape and traveling in the forward direction 30, then centers the forward read transducer 24 transversely in the reference track 16. A suitable method for the centering procedure is to use the read transducer amplifier in a sensing path to detect the loss of data as the tape 10 moves in the forward direction 30 while the head 20 is stepped across the transverse width of the reference track 16. From the positions of the track edges (16a, 16b), the width of the track 16 may be found, and the forward read transducer 24 is centered by dividing the width by two and appropriately activating the head positioning motor mechanism 28.

Note that by taking the center of the reference track 16 to be the reference location for subsequent steps of the method of the invention, the forward read transducer offset value, as measured from the reference location, is identically zero. This is only a preferred embodiment, however, as any unique location (e.g., one of the edges of the reference track 16a or 16b) could serve as the reference-location, making the forward read transducer offset value non-zero, and positive or negative depending where the reference location was chosen. Generally, the physical edge 10a of the tape 10 which is closest to the reference plane "B" is identified as the "bottom" of the tape 10, and moving from the bottom 10a to the top 10b of the tape 10 is considered a positive transverse displacement.

Referring to section 12b of tape 10, the second offset value, that of the write transducer, is found next. After centering the forward read transducer 24 in the reference track 16, and while still reading in the forward tape direction 30, the reverse read transducer 26 is transversely centered in the reference track 16. Note that during reading in the forward tape direction 30, the reverse read transducer 26 normally is not functional at all, because the tape 10 is moving in the forward direction 30 and not the reverse direction 32. The centering process may be accomplished for the reverse read transducer 26 in the same manner as for the forward read transducer 24.

The amount of displacement required to center the reverse read transducer 26 is called the forward-to-reverse read transducer offset. It can be a positive or negative number, depending on the direction and magnitude of the misalignment of the tape 10 to the head 20 as measured over the distance between the two read transducers 24 and 26. This value may then be used with the known lateral displacement of the write transducer 22 from either read transducer 24 or 26 to determine the second offset value, that of the write transducer 22. "This value is particularly useful in the correction of errors due to tape slope, the effects of which appear most dramatically when comparing operations performed on opposite sides of the tape." In the preferred embodiment, the write transducer 22 is evenly spaced between the two read transducers 24 and 26, and thus the write transducer offset value is simply one-half (including sign) of the forward-to-reverse read transducer offset value.

Referring to portion 14 of tape 10, the third offset value, that of the reverse read transducer 26, may be found after the tape 10 has fully traveled from beginning 12 to end 14, and reversed direction from forward direction 30 to reverse direction 32. The drive moves the head 20 to a reverse direction reference track 18 (which is a specified displacement away from the forward direction reference track 16) while the tape 10 is proceeding in the reverse direction 32. Then the drive centers the reverse read transducer 26 in a manner similar to that employed earlier for the forward read transducer 24. Other than the expected specified displacement, the offset value from the forward read transducer reference location is the third, reverse read transducer offset value. Again, this value can be a positive or negative number. It represents the transverse offset, other than the specified displacement between the reference tracks 16 and 18, that exists between the forward and reverse read transducers 24 and 26 while reading reference tracks (16, 18) in their respective tape motion directions (30, 32).

Once the three transducer offset values are known, they are applied as correction factors during any track change command, including a command to "change" to the same track, which is possible for certain purposes (e.g., to reverse tape direction and read the data written on the same track immediately before the command). Because each of the transducers has its own offset value, the invention allows such a command to involve a slight change in head position to align the specific transducer of interest, rather than assuming that correction of errors with respect to one transducer in the multi-transducer head is sufficient to correct errors for all transducers.

The use of an offset value for each transducer is a particular advantage of the invention, because it allows the write transducer in particular to be more accurately positioned than in the past. This allows recording systems to have higher track density to overcome the problems that arise when attempting to accurately position a write transducer with respect to a tape that was previously used with another drive.

The offset value (magnitude and direction) corrects for tape slope and azimuth error. The correction may be applied either before or after changing the track or operation, and preferably is incorporated directly into the change of track or operation.

Note that the drive must know the tape motion direction of the intended track and the intended purpose (read or write) of the track change. Changing the operation of the drive without changing the track identity is just "changing" to the same track but for a different purpose.

The invention may be implemented in a variety of ways in a recording drive, including computer code written for a microprocessor controlling the head positioning motor and associated equipment, in accordance with principles known in the art. When doing so, use of a non-continuous stepper motor drive allows the offset values to be expressed as signed binary numbers representing the direction and number of steps required to move the head.

EXAMPLE

The method of the invention was implemented in a recording drive meeting the QIC-1350 format for belt-driven magnetic recording cartridges employing serial serpentine recording in a streaming mode.

The magnetic recording tape was 6.35 mm (0.25 inch) wide and comprised thirty tracks each having a center-line spacing of 0.1905 mm (0.0075 inch). Even numbered tracks 0–28 were recorded in the forward direction from the beginning of the tape to the end, and odd numbered tracks 1–29 were recorded in the reverse direction from the end of the tape to the beginning. Tracks 0 and 1 comprised prerecorded reference bursts for their respective directions, specifically a 393.7 flux transitions per millimeter (FTPMM) (10K FTPI) continuous recording between the beginning-of-tape (BOT) and forward load point (LP) markers (for track 0); and a similar burst between early warning (EW) and end-of-tape (EOT) markers (for track 1). Even tracks 2–12 and odd tracks 3–13 similarly comprised (787.4 FTPMM) (20K FTPI) reference bursts.

The recording head comprised a write transducer that was 0.1778 mm (0.007 inch) wide along a center line transverse to tape travel direction. The write transducer was separated from the parallel center lines of each of two 0.0762 mm (0.003 inch) wide read transducers by 5.08 mm (0.2 inch). The along-track center line of the two read transducers is within 0.00381 mm (150 $\mu$inch) of the along-track center line of the write transducer.

Longitudinal displacement of the head was done using a fine resolution (0.000396875 cm per step) (0.00015625 inch per step), 48 steps per track stepper motor mechanism suitably attached to the recording head.

To find the first offset value, that of the forward read transducer, a forward direction reference burst was located, and the then the forward read transducer was transversely centered in the track containing the burst.

Next, the second offset value, that of the write transducer, was determined. After centering the forward read transducer in the reference track, and while still reading in the forward tape direction, the reverse read transducer was centered transversely in the reference track. The value (in signed binary steps of the stepper motor) of the amount of displacement required, i.e., the forward to reverse read transducer offset value, was simply divided in two to find the write transducer offset value.

The third offset value, that of the reverse read transducer, was found after the tape had wound to the end and the direction of tape travel was reversed. Then, with reference to a head position corresponding to the forward read transducer being centered in the forward direction reference track (e.g., track 0), the reverse read transducer was centered in the reverse direction reference track (e.g., track 1), which was a specified displacement away from the forward direction reference track, while the tape was proceeding in the reverse direction. Other than the expected specified displacement, the offset value from the forward read transducer reference location (in signed binary steps) was the third, reverse read transducer offset value.

Once the three transducer offset values were found, they were applied as correction factors to any track change command, including a command to "change" to the same track, as an integral part (at the beginning) of the track/operation change command. In the QIC-1350 format, the direction is inherent in the identity of the intended track, because all even numbered tracks are written in the forward direction and all odd numbered tracks are written in the reverse direction. Also, only one binary value is needed to identify the intended operation, either write (unique) or read (forward or reverse), since the choice of direction positively identifies the specific read transducer applicable. A command to change the operation of the drive without changing the track is just a command to go to the same track for a different purpose.

The preferred implementation of the invention in a recording drive was by computer code written in the assembly language of a Intel 87C51FB Microprocessor controlling all major functions of the drive.

Four RAM memory cells, each eight bits wide, stored the required data. The first cell held the forward to reverse read transducer offset value in signed binary. The second cell held the reverse read transducer offset value, also in signed binary. The third cell held the present transducer reference, also in signed binary. The fourth cell held a coded value of the present transducer reference, so that the user could determine which transducer reference was being used by the drive at any time.

For each of the first and second cells, the initial value defaulted to a unique arbitrary value indicating that no value had yet been established, e.g., upon drive start or insertion of a new data cartridge. The third and fourth cells similarly defaulted to the forward read transducer reference, and its coded value, respectively.

No RAM memory cell was required to hold the forward read transducer reference, because according to the preferred embodiment, the forward read transducer was centered in the reference track and thus the offset value was always zero. Also, no RAM memory cell was required to hold the write transducer offset value, because in this example the write transducer was halfway between the forward and reverse read transducers, and thus the write transducer offset value was always one-half of the signed value of the forward to reverse read transducer offset value, held in the first RAM memory cell.

We claim:

1. A method of aligning, with respect to a magnetic recording tape having a beginning, an end, a line of travel between the beginning and the end, and first and second tracks substantially parallel to the line of travel recorded with a recognizable signal, a magnetic head comprising a forward read transducer, a write transducer, and a reverse read transducer, each transducer having a longitudinal spacing distance from each other transducer; the method comprising the steps of:
   (a) at the beginning of the magnetic recording tape, locating a reference location and the location of the first track with respect to that reference location,
   (b)
      (1) while the tape is moving in a forward direction, transversely centering the forward read transducer with respect to the first track,
      (2) determining the amount of transverse movement required to perform step (b)(1),
      (3) establishing a first, forward read transducer offset value from the result of step (b)(2),
   (c)
      (1) while the tape is still at the beginning of the tape and moving in the forward direction, transversely moving the head until the reverse read transducer is centered with respect to the first track,
      (2) determining the amount of transverse movement required to perform step (c)(1),
      (3) establishing a second, write transducer offset value from the result of step (c)(2) and the longitudinal spacing distances between transducers,
   (d) upon reaching the end of the tape, reversing direction of tape travel to a reverse direction,
   (e) while the tape is moving in the reverse direction, transversely centering the reverse read transducer in the second track, thus establishing a third, reverse read transducer offset value, and
   (f) compensating movement of the head, if any, required for any particular transducer to access any track, by applying one of the first, second, and third offset values specific to the particular transducer.

2. The method of claim 1 in which the track of step (f) is the same track as that located in step (a).

3. The method of claim 1 in which the track of step (f) is a different track from that located in step (a).

4. The method of claim 1 in which the particular transducer of step (f) is the forward read transducer, and the offset value applied in step (f) is the first offset value.

5. The method of claim 1 in which the particular transducer of step (f) is the write transducer, and the offset value applied in step (f) is the second offset value.

6. The method of claim 1 in which the particular transducer of step (f) is the reverse read transducer, and the offset value applied in step (f) is the third offset value.

7. The method of claim 1 in which the write transducer is longitudinally spaced evenly between the forward read transducer and the reverse read transducer such that the second, write transducer offset value determined in step (c)(3) is one-half the displacement determined in step (c)(2).

8. The method of claim 1 in which the reference location is the center of the first track such that the first offset value is identically zero.

* * * * *